United States Patent
Cho et al.

(10) Patent No.: US 9,520,936 B2
(45) Date of Patent: Dec. 13, 2016

(54) METHOD OF UPDATING BS SYSTEM INFORMATION OF A RELAY STATION IN A BROADBAND WIRELESS ACCESS SYSTEM

(75) Inventors: Hee Jeong Cho, Anyang-si (KR); Ki Seon Ryu, Gyeonggi-do (KR); In Uk Jung, Anyang-si (KR); Yong Ho Kim, Anyang-si (KR); Young Soo Yuk, Anyang-si (KR); Gi Won Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 477 days.

(21) Appl. No.: 12/862,487

(22) Filed: Aug. 24, 2010

(65) Prior Publication Data

US 2011/0044233 A1   Feb. 24, 2011

Related U.S. Application Data

(60) Provisional application No. 61/236,158, filed on Aug. 24, 2009, provisional application No. 61/236,864, (Continued)

(30) Foreign Application Priority Data

Mar. 31, 2010 (KR) .................. 10-2010-0029254
Aug. 13, 2010 (KR) .................. 10-2010-0078228

(51) Int. Cl.
    *H04B 7/155*   (2006.01)
(52) U.S. Cl.
    CPC .................... *H04B 7/155* (2013.01)

(58) Field of Classification Search
    CPC ..... H04B 7/155; H04W 16/26; H04W 84/047; H04W 88/04
    (Continued)

(56) References Cited

U.S. PATENT DOCUMENTS

2005/0153700 A1*  7/2005  Farnsworth et al. ......... 455/446
2006/0050742 A1*  3/2006  Grandhi et al. ............. 370/506
(Continued)

FOREIGN PATENT DOCUMENTS

JP   2007-116697 A    5/2007
RU   2 340 121 C2    11/2008
(Continued)

OTHER PUBLICATIONS

IEEE 802.16j "Part 16: Air Interface for Broadband Wireless Access System" Amendment 1: Multihop Relay Specification. IEEE Jun. 12, 2009.*
(Continued)

*Primary Examiner* — Stephen J Clawson
(74) *Attorney, Agent, or Firm* — Birch, Stewart, Kolasch & Birch, LLP

(57) ABSTRACT

A method for efficiently updating system information of a base station at a relay station of a broadband wireless access system and an apparatus for performing the method are disclosed. The method for updating system information of an advanced base station (ABS) at an advanced relay station (ARS) of a broadband wireless access system comprises receiving a first message, which includes changed information of the system information of the base station, from the base station; transmitting a second message for acknowledgment of the first message to the base station; and performing application for the changed information.

10 Claims, 8 Drawing Sheets

Related U.S. Application Data filed on Aug. 25, 2009, provisional application No. 61/240,599, filed on Sep. 8, 2009, provisional application No. 61/240,623, filed on Sep. 8, 2009, provisional application No. 61/241,383, filed on Sep. 10, 2009, provisional application No. 61/260,400, filed on Nov. 12, 2009.

(58) Field of Classification Search
USPC .......................................................... 370/315
See application file for complete search history.

(56) References Cited

U.S. PATENT DOCUMENTS

| | | | |
|---|---|---|---|
| 2006/0098613 A1* | 5/2006 | Kish et al. | 370/338 |
| 2007/0264933 A1* | 11/2007 | Kang et al. | 455/13.1 |
| 2008/0043712 A1* | 2/2008 | Hart et al. | 370/348 |
| 2009/0161591 A1 | 6/2009 | Ahmadi et al. | |
| 2010/0304667 A1 | 12/2010 | Chen et al. | |

FOREIGN PATENT DOCUMENTS

| | | |
|---|---|---|
| RU | 2 369 012 C2 | 9/2009 |
| WO | WO 2007/024065 A1 | 3/2007 |
| WO | WO 2007/086842 A1 | 8/2007 |
| WO | WO 2008/004808 A1 | 1/2008 |
| WO | WO 2008/137417 A2 | 11/2008 |
| WO | WO 2009/071583 A1 | 6/2009 |
| WO | WO 2009/086744 A1 | 7/2009 |
| WO | WO 2009/096714 A2 | 8/2009 |

OTHER PUBLICATIONS

Wang, Sheng-Shih, et. al. "Efficient Data Forwarding Schemes for IEEE 802.16j Multi-hop Relay Networks" Mobile WiMax Symposium. Jul. 9-10, 2009.*

IEEE Std. 802.16j, "Part 16: Air Interface for Broadband Wireless Access Systems, Amendment 1: Multihop Relay Specification," IEEE-SA Standards Board, Jun. 12, 2009, pp. 1-24.

Peters et al., "The Future of WiMAX: Multihop Relaying with IEEE 802.16j," IEEE Communications Magazine, Jan. 2009, pp. 104-111.

Sydir et al., "An Evolved Cellular System Architecture Incorporating Relay Stations," IEEE Communications, Jun. 2009, pp. 115-121.

Tao et al., "Frame Structure Design for IEEE 802.16j Mobile Multihop Relay (MMR) Networks," IEEE Communications, Nov. 30, 2009, pp. 4301-4306.

15.3.6.5 DL Control Information Elements, 15.3.6.5.1 Broadcast Control Information Elements, 15.3.5.1.1 P-SFH IE, IEEE 802 16m-09/0010r2, Jun. 1, 2009, 5 pages.

Part 16: Air Interface for Fixed and Mobile Broadband Wireless Access Systems, 802-16m-09/0010r1a (Working Document), IEEE Std. 802.16j-2009, Mar. 2008, 7 pages.

"Draft amendment to IEEE standard for local and metropolitan area networks part 16: Air interface for broadband wireless access systems advanced air interface: P80216_D1." IEEE Draft; P80216M-D1, IEEE-SA, Piscataway, NJ USA, vol. 802.16, No. D1, Jul. 31, 2009, pp. 1-514, XP068048119.

"IEEE Standard for local and metropolitan area networks part 16: Air interface for broadband wireless access systems amendment 1: Multiple relay specification: IEEE Std 802.16j-2009 (Amendment to IEEE Std 802.16-2009," IEEE Standard, IEEE, Piscataway, NJ, USA, Jun. 12, 2009, pp. c1-290, XP017604214.

* cited by examiner

METHOD OF UPDATING BS SYSTEM INFORMATION OF A RELAY STATION IN A BROADBAND WIRELESS ACCESS SYSTEM

This application claims the benefit of the Korean Patent Application Nos. 10-2010-0029254, filed on Mar. 31, 2010 and 10-2010-0078228, filed on 13 Aug. 2010, which are hereby incorporated by references as if fully set forth herein.

This application also claims the benefit of U.S. Provisional Application Ser. Nos. 61/236,158, filed on Aug. 24, 2009, 61/236,864, filed on Aug. 25, 2009, 61/240,599, filed on Sep. 8, 2009, 61/241,383, filed on Sep. 10, 2009, 61/240,623, filed on Sep. 8, 2009 and 61/260,400 filed on Nov. 12, 2009, the contents of which are hereby incorporated by reference in their entirety.

BACKGROUND OF THE INVENTION

1. Field of the Invention

The present invention relates to a broadband wireless access system, and more particularly, to a method of efficiently updating system information of a base station in a relay station and an apparatus for performing the method.

2. Discussion of the Related Art

It is expected that a relay station (RS) will widely be used in a wireless communication system for next generation. Hereinafter, the relay station (RS) will be described in brief.

A standardization project of a new title called multi-hop relay is currently in progress in IEEE (Institute of Electrical and Electronics Engineers) 802.16 of 2006 since publications of the standard IEEE 802.16-2004 based on fixed subscriber mobile stations and the standard IEEE 802.16e-2005 for providing mobility of subscriber mobile stations.

This standardization project handled by a task group j (IEEE 802.16j) within the IEEE 802.16 has started to discuss usage model, related terminologies, and technical requirements in the second meeting on July of 2006 after the first formal meeting on May of 2006. Hereinafter, the IEEE 802.16 task group j will be abbreviated as "802.16j".

The concept of the relay station which will be described later can be used substantially the same as a relay station considered by a 3GPP LTE-A system. Also, a relay station that performs same or similar functions in other various wireless access systems can be used similarly to the relay station described in the present invention.

Project authorization request (PAR) of 802.16j is intended for coverage extension and throughput enhancement as standardization tasks which will be performed.

The relay station can be divided into two types of relay stations, i.e., a transparent relay station and a non-transparent relay station. According to the transparent relay station, all operations and functions are performed within the relay station, and a mobile station is managed by the relay station. On the other hand, according to the non-transparent relay station, all operations and functions are performed between a macro base station and a mobile station. In this case, the non-transparent relay station serves to perform its relay function through the macro base station between the macro base station and the mobile station.

The mobile station regards the transparent relay station and the non-transparent relay station as one macro base station without identification of the transparent relay station and the non-transparent relay station. In this case, although there is no change in operations, the mobile station may classify the relay station from the macro base station.

A network that includes a relay station includes a base station (BS), a relay station (RS), and a mobile station (MS). The mobile station can receive a radio signal even outside a cell zone of the base station through the relay station. Also, a path of high quality having an adaptive modulation and coding (AMC) scheme of high level can be set through the relay station for the mobile station within the cell zone of the base station. Accordingly, a user can obtain an advantage of system throughput enhancement by using the same radio resource.

The standard to be made by the 802.16j project has predetermined requirements. For example, the mobile station implemented based on the existing 802.16-2004 and 802.16e-2005 should perform communication with the relay station without any additional function. Accordingly, an application range of the relay station can be limited to the existing system in such a way to add some function for controlling the relay station to the relay station and the existing base station. It is expected that the standard for the relay station will be a core factor of the standardization.

The relay station can be regarded as a subscriber mobile station that performs operations of a physical layer and a media access control (MAC) layer. Also, the relay station is mainly controlled by the base station but may have a predetermined control function if necessary. As usage models currently in discussion, in addition to a fixed relay station, various types of relay stations are considered. Examples of the relay stations include a mobile relay station for temporarily providing a service to a specific zone and a relay station that can be built in cars or subways.

Main technical issues which will be discussed later can be described as follows:

1) a procedure for identifying a relay station existing in a base station and acquiring and maintaining information on topology with the relay station;

2) definition of a physical transport frame structure between a mobile station and a relay station, which have backward compatibility with the existing IEEE 802.16 system;

3) a signal procedure for providing mobility between relay stations or between a relay station and a base station; and 4) a network entry procedure of a relay station to a base station and an entry procedure of a mobile station through a relay station.

The relay station performs data exchange with both the mobile station and the base station. However, since the relay station is synchronized with the base station, the relay station and the base station broadcast system information at the same time. Accordingly, the relay station broadcasts its system information in accordance with a transmission mode at the time when the base station broadcasts system information. In this case, a problem occurs in that the relay station fails to receive system information of the base station. Also, as described above, the relay station has an interval for receiving data from the base station. In this respect, a method for reporting the interval to the mobile station and a subordinate relay station will be required.

SUMMARY OF THE INVENTION

Accordingly, the present invention is directed to a method of efficiently updating system information of a base station in a relay station and an apparatus for performing the method, which substantially obviate one or more problems due to limitations and disadvantages of the related art.

An object of the present invention is to provide a method of efficiently acquiring changed system information of a base station in a relay station and an apparatus for the same.

Another object of the present invention is to provide a method of efficiently transmitting system information additionally required for a relay station to a mobile station and a subordinate relay station and an apparatus for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for updating system information of an advanced base station (ABS) at an advanced relay station (ARS) of a broadband wireless access system comprises receiving a first message, which includes changed information of the system information of the base station, from the base station; transmitting a second message for acknowledgment of the first message to the base station; and performing application for the changed information.

In this case, the system information includes a first sub-packet, a second sub-packet, and a third sub-packet, and the changed information includes a change count field indicating change counts of the system information, a bitmap field indicating whether each of the sub-packets has been updated as 1 bit, and update information of a sub-packet corresponding to the bit set to '1' in the bitmap field.

Also, the update information of each sub-packet includes a super-frame number action field indicating the time when the update information of the corresponding sub-packet is applied, in a superframe unit, and the step of performing application for the changed information is performed per sub-packet at the time indicated by the super-frame number action field.

In another aspect of the present invention, a method for reporting change of system information from an advanced base station (ABS) to an advanced relay station (ARS) in a broadband wireless access system comprises transmitting a first message, which includes changed information of the system information of the base station, to the relay station; and receiving a second message for acknowledgment of the first message from the relay station.

In this case, the system information includes a first sub-packet, a second sub-packet, and a third sub-packet, the changed information includes a change count field indicating change counts of the system information, a bitmap field indicating whether each of the sub-packets has been updated as 1 bit, and update information of a sub-packet corresponding to the bit set to '1' in the bitmap field, and the update information of each sub-packet includes a super-frame number action field indicating the time when the update information of the corresponding sub-packet is applied, in a superframe unit.

Also, the method further comprises retransmitting the first message to the relay station if the second message is not received from the relay station.

In other aspect of the present invention, an advanced relay station (ARS) operated in a broadband wireless access system comprises a processor; and a radio frequency (RF) module transmitting and receiving a radio signal to and from the outside under the control of the processor, wherein the processor acquires changed information of system information of an advanced base station (ABS) through a first message received from the base station, transmits a second message for acknowledgment of the first message to the base station by controlling the RF module, and controls the RF module to perform application for the changed information.

In this case, the system information includes a first sub-packet, a second sub-packet, and a third sub-packet, and the changed information includes a change count field indicating change counts of the system information, a bitmap field indicating whether each of the sub-packets has been updated as 1 bit, and update information of a sub-packet corresponding to the bit set to '1' in the bitmap field.

Also, the update information of each sub-packet includes a super-frame number action field indicating the time when the update information of the corresponding sub-packet is applied, in a superframe unit, and the step of performing application for the changed information is performed per sub-packet at the time indicated by the super-frame number action field.

In the above aspects, the first message is preferably transmitted from the base station in accordance with an event-triggered mode whenever the system information is changed.

Preferably, in the above aspects, the first message is a relay station essential system information (RS_ESI) message, and the second message is an ACK (AAI_MSG-ACK) message.

According to the embodiments of the present invention, the following advantages can be obtained.

First, the relay station can efficiently acquire changed system information of the base station through the essential system information message and apply the acquired system information at the time when the base station desires to do it.

In addition, system information additionally required for the relay station, such as zone information and hop information, can efficiently be transmitted to the mobile station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
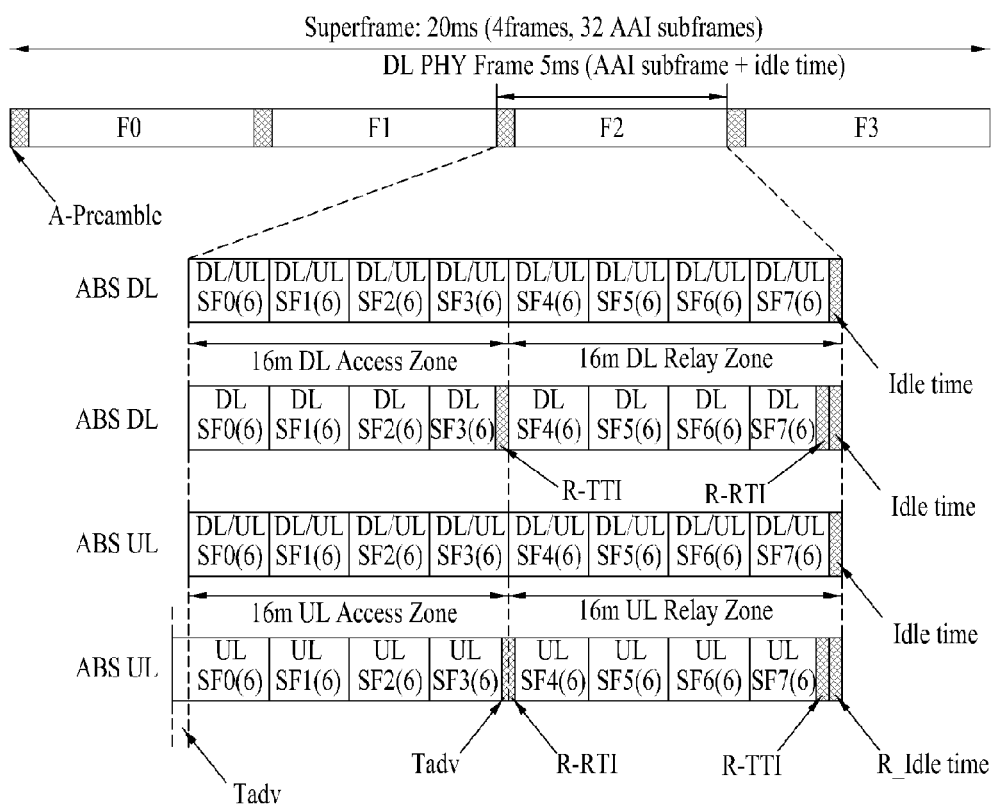
FIG. 1 is a diagram illustrating frame structures of a relay station and a base station according to a frequency division duplex (FDD) mode of a general IEEE 802.16m system.

Reference will now be made in detail to the preferred embodiments of the present invention, examples of which are illustrated in the accompanying drawings. Wherever possible, the same reference numbers will be used throughout the drawings to refer to the same or like parts.

The present invention relates to a wireless access system. Hereinafter, the embodiments of the present invention disclose methods of efficiently transmitting/updating system information of a relay station.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station (BS) may be replaced with terms such as a fixed station, Node B, eNode B (eNB), an access point (AP), and an advanced BS (ABS).

Also, the mobile station may be replaced with terms such as a user equipment (UE), a mobile subscriber station (MSS), an advanced MS (AMS), a mobile subscriber station (MSS), and a mobile terminal (MT).

The embodiments according to the present invention can be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16Rev2, and IEEE P802.16m.

Specific terminologies hereinafter used in the embodiments of the present invention are provided to assist understanding of the present invention, and various modifications can be made in the specific terminologies within the range that they do not depart from technical spirits of the present invention.

Hereinafter, the following assumptions are applied to a broadband wireless access system that includes a relay station according to the embodiments of the present invention will be described:

1) a relay station is synchronized with a macro base station;

2) even a mobile station is served from the relay station, it is synchronized with a macro base station to which the corresponding relay station belongs;

3) in case of a transparent relay station (RS), a media access control (MAC) management message is transmitted to the mobile station by a macro base station only or through a relay station;

4) the relay station may have a function of calculating code division multiplexing access (CDMA) code signal measurement information or channel state information (CQI) measurement information for physical control; and 5) scheduling can be configured in a centralized scheduling mode or a distributed scheduling mode.

In the embodiments of the present invention, an advanced relay station (ARS) can be divided into an odd hop ARS and an even hop ARS depending on the number of hops with the ABS. The odd hop ARS and the even hop ARS can have a hierarchical structure, and one network can include one or more odd hop ARSs and one or more even hop ARSs.

A frame structure used in the relay station can include a downlink frame structure and an uplink frame structure. At this time, the downlink frame structure includes a downlink (DL) access zone and a downlink relay zone while the uplink frame structure includes an uplink (UL) access zone and an uplink relay zone.

In this case, if one relay station exists (one hop structure) between the base station and the mobile station, the downlink access zone represents an interval where the ARS transmits data packets, etc. to the AMS, and the uplink access zone represents an interval where the AMS transmits data packets, etc. to the ARS. Also, the ARS can receive data packets from the ABS at the downlink relay zone, and can transmit data packets to the ABS at the uplink relay zone.

Figure 2:
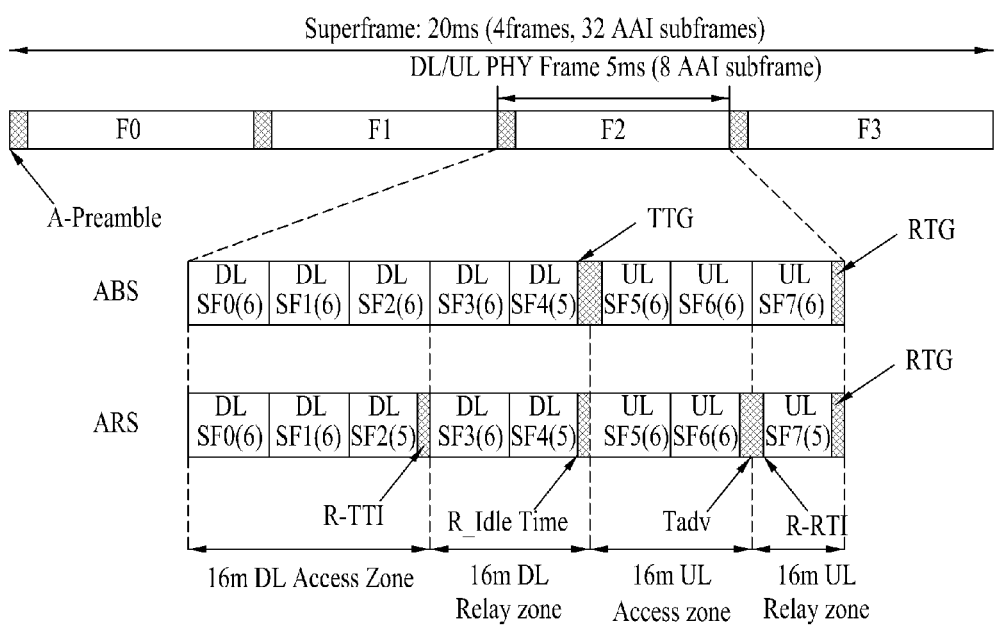
FIG. 2 is a diagram illustrating frame structures of a relay station and a base station according to a time division duplex (TDD) mode of a general IEEE 802.16m system.

The frame structure of the relay station in such a hop structure is illustrated in FIG. 1 and FIG. 2.

FIG. 1 is a diagram illustrating frame structures of a relay station and a base station according to a frequency division duplex (FDD) mode of a general IEEE 802.16m system, and FIG. 2 is a diagram illustrating frame structures of a relay station and a base station according to a time division duplex (TDD) mode of a general IEEE 802.16m system.

In FIG. 1, it is noted that an uplink and a downlink are identified by frequency and an access zone and a relay zone within one frame are respectively allocated for four subframes. Also, in FIG. 2, it is noted that an uplink and a downlink are identified by time division and an access zone and a relay zone are again identified by time division within each of the uplink and the downlink. In FIG. 1 and FIG. 2, a gap for shifting the corresponding zone exists between the respective zones.

In the aforementioned frame structure, the relay station ARS can broadcast its system information through a super frame header (SFH) at the downlink access zone. Also, the relay station can transmit system information comprised of the same fields as those of the SFH transmitted from the base station. At this time, values of the fields may be different from the value transmitted from the base station. However, the identifier field (i.e., BSID field) of the relay station includes its BS identifier not RS identifier. This is because that BS identifier not RS identifier is required during a handover process of the mobile station.

The relay station includes additional system information not used by the base station ABS in addition to the system information broadcasted through the SFH. Examples of the additional system information include information indicating the access zone and the relay zone at the uplink and the downlink and location and/or size of the gap existing between the respective zones.

A method for efficiently transmitting additional system information for a relay station to a mobile station or a subordinate relay station in accordance with one embodiment of the present invention will be described below.

First Embodiment

According to one embodiment of the present invention, a method for efficiently transmitting additional system information for a relay station to a mobile station or a subordinate relay station is provided.

First of all, a method for reporting information of each zone at a downlink in accordance with one embodiment of the present invention will be described.

The reason why that information of each zone at a downlink should be reported to a mobile station or a subordinate relay station is that the mobile station or the subordinate relay station may recognize data transmitted from a base station to a corresponding relay station as its data (data may be noise or interference actually). Also, if the subordinate relay station knows a transmission zone of data or signaling transmitted thereto, it does not have to read A-MAP information within an unnecessary zone.

In this respect, this embodiment suggests a method for reporting downlink/uplink zone information (relay zone information and access zone information) through A-MAP zone at a downlink subframe. This method will be described with reference to FIG. 3 and FIG. 4.

Figure 3:
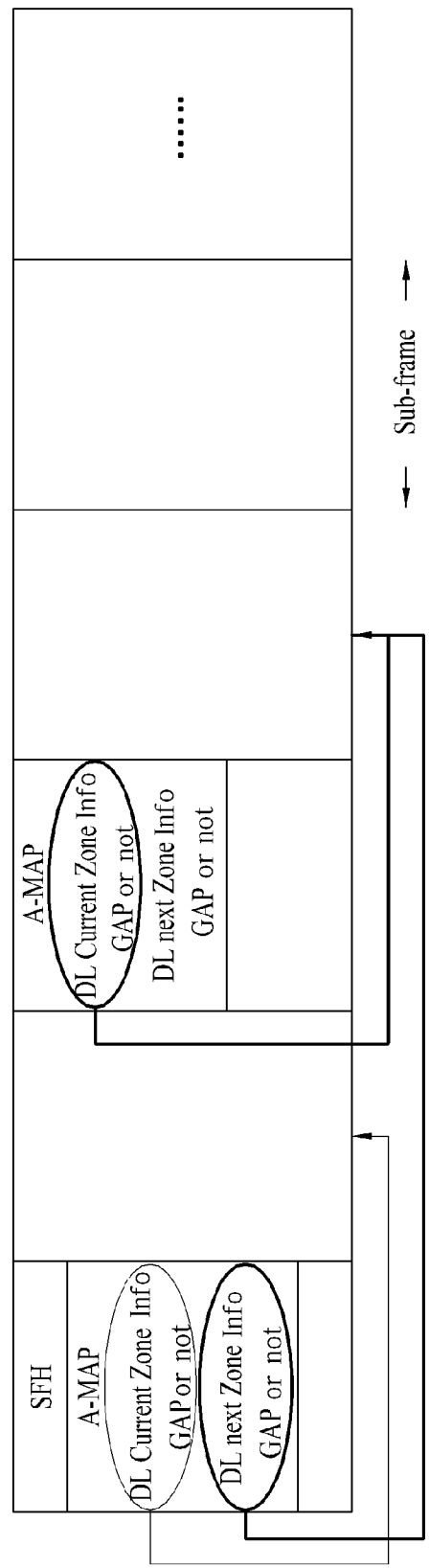
FIG. 3 is a diagram illustrating an example of reporting zone information of a relay station through a map zone in accordance with one embodiment of the present invention.

FIG. 3 is a diagram illustrating an example of reporting zone information of a relay station through a map zone in accordance with one embodiment of the present invention.

Referring to FIG. 3, the A-MAP zone of the first downlink subframe includes information on type, length and gap of a current zone and information on type, length and gap of the next zone. The A-MAP zone of the subframe where the next zone starts includes information on type, length and gap of the corresponding zone and information on type, length and gap of the next zone. In this way, if the relay station is operated in a reception mode (for example, downlink relay zone) at the next zone of the current zone, the mobile station or the subordinate relay station can recognize that the signal of the corresponding zone is not for itself, and can receive the signal of the corresponding relay station after the next zone ends.

Although FIG. 3 illustrates the downlink subframe only, information on the uplink zone may be included in a corresponding uplink A-MAP zone.

Figure 4:
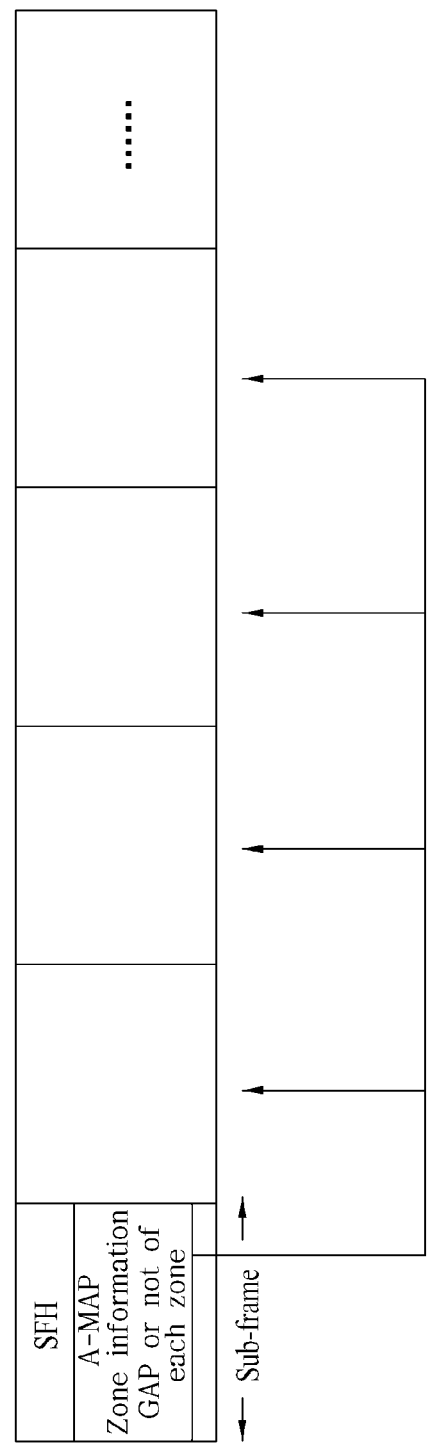
FIG. 4 is a diagram illustrating another example of reporting zone information of a relay station through a map zone in accordance with one embodiment of the present invention.

FIG. 4 is a diagram illustrating another example of reporting zone information of a relay station through a map zone in accordance with one embodiment of the present invention.

Referring to FIG. 4, in addition to information of a zone to which the corresponding subframe belongs, every zone information and gap information within a corresponding superframe can be transmitted to the A-MAP zone of the first downlink subframe. In this case, if the mobile station or the subordinate relay station successfully receives the A-MAP zone of the first subframe, additional information for next zone is not required.

In the mean time, zone information and gap information of each zone may be transmitted through the A-MAP zone of each subframe.

The zone information and the gap information of each zone may be transmitted through the SFH, which transmits essential system information, or AAI_SCD message for transferring additional system information, in addition to the A-MAP zone of each subframe. At this time, the subordinate relay station should not accept network entry of its subordinate relay station and the mobile station until it receives the zone information and the gap information.

Next, a method for transmitting hop information (odd-hop or even hop), hop counts and relay station identifier in accordance with the embodiment of the present invention will be described. The correlation between a base station and a relay station and between a relay station and another relay station will be described with reference to FIG. 5.

Figure 5:
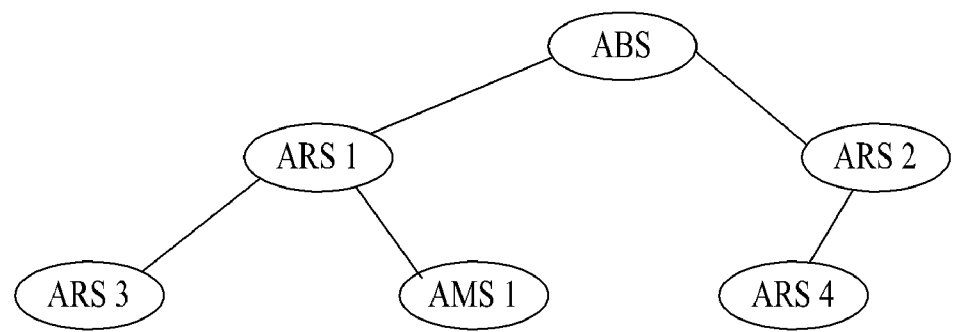
FIG. 5 is a diagram illustrating an example of a network arrangement of a base station and a subordinate relay station.

FIG. 5 is a diagram illustrating an example of a network arrangement of a base station and a subordinate relay station.

Supposing that network arrangement is as illustrated in FIG. 5, hop information can be divided into hop information between a base station and a relay station and hop information between a relay station and another relay station.

1) In the correlation between the ABS and the ARS 1 or between the ABS and the ARS 2, when the ARS 1 or the ARS 2 implicitly determines its hop information or enters the ABS, the ABS can report through a MAC management message that the corresponding relay station is an odd hop.

2) In the correlation between the ARS 1/2 and the ARS 3/4, when the ARS 1/2 broadcasts its hop information through the SFH, the ARS 3/4 implicitly determines its hop information, or when the ARS 3/4 enters the ARS 1/2, the ARS 1/2 can report its hop information to the ARS 3/4 so that the ARS 3/4 implicitly determines the hop information, or can directly report the hop information through the MAC message. This is because that the ARS 1/2 knows that it belongs to odd hop and the ARS 3/4 corresponding to a subordinate relay station of the ARS 1/2 belongs to even hop.

Similarly to the aforementioned method, hop counts can be reported to the relay station through the SFH broadcasted from an upper entity (i.e., base station or superordinate relay station) or the MAC message during the entry process. If the SFH is used, the relay station can implicitly determine its hop counts in such a manner that it adds 1 to hop counts of its upper entity. Also, if the MAC message is used, the upper entity may report its hop counts to a subordinate entity in the same manner as the SFH, or may directly report the hop counts of the subordinate relay station.

In the mean time, a relay station identifier means an identifier for identifying the correlation between a relay station and another relay station/other mobile station, for example, the correlation between the ARS 1 and the ARS 3/AMS 1. The relay station identifier may be a dedicated identifier allocated from the base station. In this case, the dedicated identifier may be a station identifier (STID). In order to transfer such an identifier, a method for allocating a relay station identifier through a MAC management message when a relay station enters a base station can be used between the base station and an odd hop relay station. Also, a method for transferring the relay station identifier, which is allocated from the base station, from a superordinate relay station to a subordinate relay station through the super frame header or transferring the relay station identifier to the subordinate relay station through the MAC management message when the subordinate relay station enters the superordinate relay station can be used between the superordinate relay station and the subordinate relay station.

In the mean time, according to another aspect of the present invention, a method for efficiently receiving additional broadcast information of the base station in a relay station of a broadband wireless access system is provided. First of all, additional broadcast information will be described.

In general, for communication with mobile stations, the base station transfers additional broadcast information (ABI) to the mobile station in a type of additional broadcast message (for example, AAI_SCD, AAI_NBR-ADV, AAI_PAG-ADV, AAI_MC-ADV, etc.). At this time, the additional broadcast message is transferred through a traffic channel through which general user data are transmitted. The ABI includes extended system parameters, system configuration information, and control information for DL notification.

The information of the ABI is required for system acquisition as follows.

Information for handover: Default HO RSSI and CINR averaging parameter, Hysteresis margin, Time-to-Trigger duration, Trigger information Information for MIMO: Codebook subset for PMI coordination, Codebook subset for DL MU-MIMO subset indication Information for Relay: Hop information, DL/UL allocation, Transmit/receive zone, Zone type Information for Multi-Carrier: Carrier index, Fully/Partially configured carrier indication, Center frequency, Bandwidth information, Initial access ability, Guard resource information Information for FemtoCell Information for EMBS: Service ID, MSCCH resource allocation information Information for inter-RAT: MIH capability support Information for neighbor advertisement: characteristics of neighbor BS Control and signaling information may be transmitted in the DL to provide network notifications to a single user or a group of users in the idle mode and sleep mode The base station generally transfers the additional broadcast message to the downlink access zone (i.e., transport mode), wherein the additional broadcast message includes the aforementioned additional broadcast information. At this time, the relay station is also operated in a TX mode at the time when the base station is operated in the downlink access zone. Accordingly, a method for efficiently receiving additional broadcast information (ABI) of a base station in a relay station when the additional broadcast information is changed will be required. Hereinafter, a method for efficiently receiving ABI of a base station in a relay station in accordance with another embodiment of the present invention will be described.

Method 1

The base station (or superordinate relay station) can additionally transmit additional broadcast message through the downlink relay zone. At this time, only if the ABI is changed, the base station (or subordinate relay station) may transmit a message, which includes the changed information, to the downlink relay zone.

Method 2

The base station (or superordinate relay station) can transmit additional broadcast message through the downlink relay zone only.

Method 3

The relay station (or subordinate relay station) can report change counts of the ABI and the SFH to the base station (or superordinate relay station). If the corresponding relay station (or subordinate relay station) does not include system information of latest version, the base station (or superordinate relay station) that has received the change counts transmits a message to the corresponding relay station, wherein the message includes corresponding system information.

Method 4

The base station (or superordinate relay station) can periodically transmit change counts of the ABI and the SFH to the relay station (or subordinate relay station). If the relay station (or subordinate relay station) that has received the change counts determines that system information newer than the system information of the relay station is transmitted/applied, it may request information on the message which includes corresponding system information.

In the aforementioned methods, the base station (or superordinate relay station) can request the relay station (or subordinate relay station) whether the relay station (or subordinate relay station) has received the corresponding message.

Second Embodiment

According to another embodiment of the present invention, if system information of the base station is changed, a method for efficiently receiving the changed system information in a relay station and updating the changed system information is provided.

As described above, the relay station performs data exchange with both the mobile station and the base station. However, since the relay station is synchronized with the base station, the relay station and the base station broadcast their system information at the same time. Accordingly, the relay station broadcasts its system information in accordance with a transmission mode at the time when the base station broadcasts system information. In this case, a problem occurs in that the relay station fails to receive system information of the base station, whereby the relay station fails to update the system information. This problem also occurs in the superordinate relay station and the subordinate relay station.

Accordingly, in this embodiment, a separate MAC management message is defined, and the relay station receives changed system information of the base station or superordinate relay station to update the changed system information.

The system information updated in the base station may be referred to as essential system information (ESI). The essential system information is generally transmitted through a secondary super frame header (S-SFH), and can be identified by sub-packet 1 to sub-packet 3 (i.e., S-SFH SP1, S-SFH SP2, and S-SFH SP3). These sub-packets may have transmission periods different from one another, and may be updated separately by the base station.

The relay station can determine through the SFH change count whether the system information of the base station (or superordinate relay station) has been changed. The SFH change count of the base station (or superordinate relay station) can be transmitted to the relay station (or subordinate relay station) through an advanced-MAP (A-MAP) zone. At this time, the transmission zone of the SFH change count may be a non-user specific zone (or extended non-user specific zone) or a user specific zone. In the mean time, the MAP zone can include transmission location information of system information separately transmitted for the subordinate relay station in addition to the SFH change count information. If the transmission location information is included in the A-MAP zone, the subordinate relay station can identify whether the corresponding information has been changed, and if the corresponding information is changed, can try update.

1) Transmission Type of MAC Message

The type of the MAC message (hereinafter, referred to as "relay station essential system information message" or "RS_ESI message") for transmitting the changed system information of the base station to the subordinate relay station could be a type of a broadcast message or additional broadcast message. Also, relay stations ARSs are grouped considering channel status, etc. and one multicast ID is given to the same group. In this way, the type of the MAC message may be a type of a multicast message transmitted to relay stations having the corresponding ID, or a type of a unicast message.

The corresponding message may not include encryption and security related information unlike the general MAC management message.

2) Type of MAC Message

In the mean time, the RS_ESI message type may be transmitted in one message type that includes system information within all SFHs, or may be transmitted in such a manner that system information within the P-SFH and system information within each S-SFH SP are transmitted in accordance with each message type. Also, the MAC message may indicate whether it includes each sub-packet, by using a bitmap, or may indicate that it includes a sub-packet only having set bits. For example, if the bitmap indicates 4 bits, each bit can be allocated in the same manner as 1st bit: information within P-SFH, 2nd bit: information within S-SFH SP1, 3rd bit: information within S-SFH SP2, and 4th bit: information within S-SFH SP3. However, since the P-SFH is little associated with essential system information, after the bitmap is set to 3 bits, sub-packets 1 to 3 can be allocated. Also, the MAC message for system information transmission preferably includes count information which is SFH version information.

At this time, the system information to be transmitted can be configured excluding information, such as BS ID, which is not changed, and unnecessary information.

3) Transmission Timing of MAC Message

The base station should transmit the corresponding message to the relay stations at the following transmission timing as far as at least one relay station exists in the base station.

The transmission timing of the RS_ESI message may have periodicity, and its transmission period can be set independently from or equally to a period of each sub-packet of the SFH of the base station ($N \times P_{S-SPH\_SPx}$, $N \geq 1$). At this time, the base station may report scheduling information such as transmission location and period information of the RS-ESI message during network entry. Also, the transmission timing of the RS-ESI message may be limited by only a request of the relay station. According to another transmission timing of the RS_ESI message, the RS_ESI message may be transmitted from the base station in accordance with an event triggered mode on the condition that system information is changed. At this time, the relay station may report to the base station whether the corresponding message has been received.

In order to report to the base station whether RS_ESI message has been received, the relay station may use a header such as a message ACK extended header (MAEH), or MAC message such as MR_Gereric-ACK or AAI_MSG-ACK. If a message for message ACK is not received from a specific relay station, or if a message indicating message NACK is received from the relay station, the base station can retransmit the message to the corresponding relay station only.

4) Application Timing of Updated System Information

The relay station may directly apply updated system information included in the RS_ESI message to a corresponding superframe in which the RS_ESI message is received, or may previously determine a frame or superframe to which the updated system information will be applied. Also, information on application timing may be included in all sub-packets included in the RS_ESI message, whereby the information can be applied to all the sub-packets at the same time. Also, information on application timing per sub-packet may be included in the RS_ESI message, whereby the application timing can be varied depending on each sub-packet. This timing can be set in a superframe unit.

The following Table 1 illustrates an example of the RS_ESI message according to another embodiment of the present invention.

TABLE 1

| Name | Size (bit) | Note |
|---|---|---|
| Message type | 8 | |
| Super-frame Number Action | TBD | TBD-bit LSBs of the super-frame number when the SPs shall be applied. |
| S-SFH change count | 4 | Change count of S-SFH transmitted in this message |
| S-SFH information bitmap | 3 | Only when SP1 is changed, 1st bit is set to 0b1. Only when SP2 is changed, |

TABLE 1-continued

| Name | Size (bit) | Note |
|---|---|---|
| | | 2nd bit is set to 0b1. Only when SP3 is changed, 3rd bit is set to 0b1. |
| If (1st bit of S-SFH information bitmap == 0b1) { SP 1 information } | | |
| If (2nd bit of S-SFH information bitmap == 0b1) { SP 2 information } | | |
| If (3rd bit of S-SFH information bitmap == 0b1) { SP 3 information } | | |

Referring to Table 1, the updated system information of the base station, which is included in the RS_ESI message, can be indicated through a bitmap field of 3 bits (S-SFH information bitmap) per sub-packet. At this time, the updated system information of the base station, which is included in the RS_ESI message, can be indicated in a type (0b00: SP1, 0b01: SP2, 0b10: SP3) instead of the bitmap type (S-SFH information bitmap) of 3 bits.

Also, the secondary superframe header count (S-SFH change count) can be included in the system information to indicate S-SFH count of the corresponding message. In the mean time, the RS_ESI message can include a super-frame number action field to indicate the time when the system information (i.e., each sub-packet) included in the corresponding message is applied, in a superframe unit.

The following Table 2 illustrates another example of the RS_ESI message according to another embodiment of the present invention.

TABLE 2

| Name | Size (bit) | Note |
|---|---|---|
| Message type | 8 | |
| S-SFH change count | 4 | Change count of S-SFH transmitted in this message |
| S-SFH information bitmap | 3 | Only when SP1 is changed, 1st bit is set to 0b1. Only when SP2 is changed, 2nd bit is set to 0b1. Only when SP3 is changed, 3rd bit is set to 0b1. |
| If (1st bit of S-SFH information bitmap == 0b1) { SP 1 information | | |
| Super-Frame Number Action | TBD | TBD-bit LSBs of the super-frame number when the SP 1 shall be applied. |
| } If (2nd bit of S-SFH information bitmap == 0b1) { SP 2 information | | |
| Super-Frame Number Action | TBD | TBD-bit LSBs of the super-frame number when the SP 2 shall be applied. |
| } If (3rd bit of S-SFH information bitmap == 0b1) { SP 3 information | | |
| Super-Frame Number Action | TBD | TBD-bit LSBs of the super-frame number when the SP 3 shall be applied. |
| } | | |

Table 2 is basically the same as Table 1. However, in Table 2, a Super-frame Number Action field is included in each sub-packet, whereby the application timing can be varied per each sub-packet.

The RS_ESI message that includes the information illustrated in Table 1 and Table 2 can further include information (for example, frequency axis start offset of allocated resource, size of allocated resource, time axis location of allocated resource, etc.) indicating uplink resources allocated to transmit MAC message (for example, AAI_MSG-ACK message) for identifying whether the corresponding message has been received by the relay station that has additionally received the RS_ESI message. At this time, the allocation order of the uplink resources can be determined by ascending order or descending order of the RSID value.

A detailed application example of the aforementioned RS_ESI message will be described with reference to FIG. 6.

Figure 6:
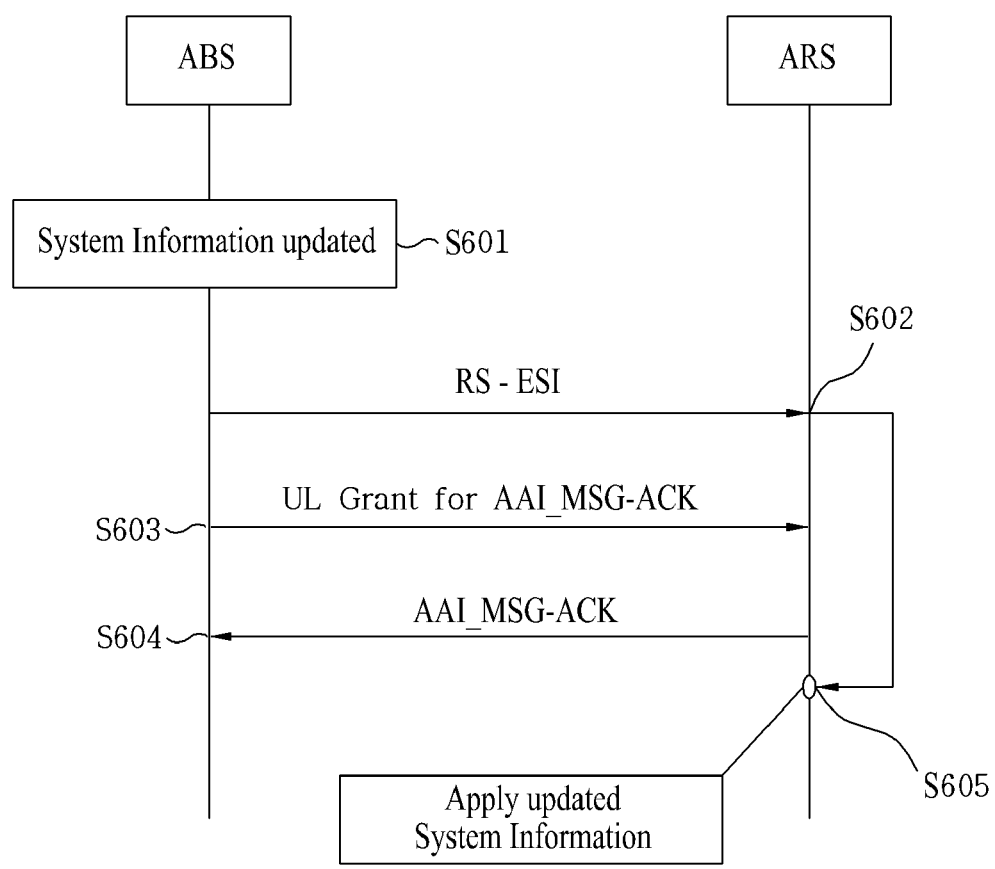
FIG. 6 is a diagram illustrating an example of a procedure of updating system information of a base station in a relay station in accordance with another embodiment of the present invention.

FIG. 6 is a diagram illustrating an example of a procedure of updating system information of a base station in a relay station in accordance with another embodiment of the present invention.

In FIG. 6, it is assumed that the RS_ESI format illustrated in Table 2 is used, and that the RS_ESI message is transmitted in accordance with an event triggered mode based on the condition that system information of the base station is updated. Also, it is assumed that the relay station uses AAI_MSG-ACK message to report to the base station whether the RS_ESI message has been received.

Referring to FIG. 6, if the system information is updated in the base station ABS (S601), the base station can transmit the updated system information to the relay station through the RS_ESI message (S602).

At this time, the base station can allocate uplink resources (UL grant for AAI_MSG-ACK or ACK grant) for transmitting the AAI_MSG-ACK message to the relay station, wherein the AAI_MSG-ACK message is intended by the relay station to report the transmission result of the RS-ESI message to the base station (S603).

At this time, UL grant, i.e., ACK grant will be described later in more detail.

The relay station that has successfully received the RS_ESI message transmits the AAI_MSG-ACK message to the base station through the uplink resources indicated by UL grant information, thereby reporting to the base station that the RS_ESI message has been received successfully (S604).

Afterwards, the relay station can perform application for update information of each sub-packet corresponding to a bit set to '1' in a bitmap (S-SFH information bitmap) included in the RS-ESI message, per sub-packet at a superframe indicated by the super-frame number action field included in the update information of each sub-packet (S605).

If the AAI_MSG-ACK message is not received in the step S604, the base station can retransmit the RS_ESI message to the relay station. In this case, retransmission can be performed before the time indicated by the super-frame number action field.

Hereinafter, a detailed example of transmitting uplink resources (UL grant for AAI_MSG-ASK or ACK grant) for AAI_MSG-ACK message from a base station to a relay station in accordance with another embodiment of the present invention will be described.

1) Transmission of ACK Grant Through Advanced Map Information Element (A-MAP IE)

If ACK grant includes allocation information only for transmitting ACK message from the relay station (or subordinate relay station) to the base station (or superordinate relay station), an example of the A-MAP IE for transmitting ACK grant from the base station to all relay stations connected with the base station will be described with reference to Table 3 below.

TABLE 3

| Name | Size (bit) | Note |
| --- | --- | --- |
| A-MAP IE type | 4 | |
| Resource Start Offset (start LRU index) | TBD | |
| Allocation size | TBD | |
| Long TTI | 1 | |
| MCRC | | CRC masked by broadcast ID |

Referring to Table 3, the MAP IE that includes ACK grant information can include resource allocation information (i.e., start offset and allocation size) that can be used by all relay stations connected with the base station. In this case, CRC of the map can be masked by broadcast ID.

If a relay station that will allocate a resource for transmitting ACK message is designated, a bitmap can be used, and the MAP IE for this can be expressed by the following Table 4.

TABLE 4

| Name | Size (bit) | Note |
| --- | --- | --- |
| A-MAP IE type | 4 | |
| The number of ARSs | TBD | |
| ARS bitmap | The number of ARSs | |
| Resource Start Offset (start LRU index) | TBD | |
| Allocation size | TBD | |
| Long TTI | 1 | |
| MCRC | | CRC masked by broadcast ID |

Referring to Table 4, a bitmap field indicating a relay station to which resources are allocated is included in the MAP IE. At this time, the allocation order of each field of the bitmap can follow RSID.

2) Transmission of ACK Grant Through A-Map IE Using Multicast ID

Hereinafter, a design type of MAP IE for allocating ACK grant to all relay stations having specific multicast ID will be described with reference to Table 5 and Table 6. In this case, it is noted that multicast ID is the same as that for RS-ESI message.

TABLE 5

| Name | Size (bit) | Note |
| --- | --- | --- |
| A-MAP IE type | 4 | |
| Resource Start Offset (start LRU index) | TBD | |
| Allocation size | TBD | |
| Long TTI | 1 | |
| MCRC | | CRC masked by multicast ID |

Referring to Table 5, the MAP IE that includes ACK grant information is similar to that of Table 3 but CRC is masked by multicast ID. At this time, the relay station can identify through MCRC information that the corresponding MAP IE includes ACK grant information for what multicast ID.

If a relay station to which a resource for transmitting ACK message is allocated is designated, a bitmap can be used, and the MAP IE for this can be expressed by the following Table 6.

TABLE 6

| Name | Size (bit) | Note |
| --- | --- | --- |
| A-MAP IE type | 4 | |
| The total number of RSs | TBD | |
| RS bitmap | The total number of RSs | |
| Resource Start Offset (start LRU index) | TBD | |
| Allocation size | TBD | |
| Long TTI | 1 | |
| MCRC | | CRC masked by multicast ID |

Referring to Table 6, a bitmap field indicating a relay station to which resources are allocated is included in the MAP IE. At this time, the allocation order of each field of the bitmap can follow RSID.

In the mean time, the MAP IE may indicate relay stations to which ACK grant is allocated in accordance with a hierarchical bitmap. This will be described with reference to Table 7 below.

TABLE 7

| Name | Size (bit) | Note |
| --- | --- | --- |
| A-MAP IE type | 4 | |
| Size of First level bitmap | TBD | |
| First level bitmap | Size of First level bitmap | |
| For (i=0; size of (first level bitmap); i++) { If (First level bitmap[i] == 1) { ARS bitmap } | TBD | |
| Resource Start Offset (start LRU index) | 7 | |
| Allocation size | TBD | |
| Long TTI | 1 | |
| MCRC | | CRC masked by multicast ID |

Referring to Table 7, the MAP IE for ACK grant allocation includes a first level bitmap field and a relay station (ARS) bitmap field.

The first level bitmap field indicates a range of ARS ID. For example, it is assumed that a range is determined in a unit of 10. In this case, if the first bit is 1, each bit of the bitmap of the relay station means relay stations having IDs 0bxxxxx0000001 to 0bxxxxx0001010. If the second bit is 1, each bit of the bitmap of the relay station means relay stations having IDs 0bxxxxx0001011 to 0bxxxxx0010100.

If the bitmap field of the relay station is not included in the MAP IE, it can mean that it is allocated to all ARSs within a corresponding range.

Also, in order to indicate a relay station to which ACK grant is allocated, a method for indicating ID of a start relay station and the number of relay stations to which ACK grant is allocated may be used. This will be described with reference to Table 8.

TABLE 8

| Name | Size (bit) | Note |
|---|---|---|
| A-MAP IE type | 4 | |
| Start number of ARS ID | TBD | |
| The number of ARSs | TBD | |
| Resource Start Offset (start LRU index) | 7 | |
| Allocation size | TBD | |
| Long TTI | 1 | |
| MCRC | | CRC masked by multicast ID |

Referring to Table 8, the start number of ARS ID field and the number of ARSs field can be included in the MAP IE for ACK grant allocation to indicate a relay station to which ACK grant is allocated.

For example, if the Start number of ARS ID field has a value of 0bxxxxx0011101 and the number of ARSs field has a value of 2, it indicates that corresponding ACK grant is allocated to a relay station having IDs of 0bxxxxx0011101 and 0bxxxxx0011110.

Each field included in the A-MAP IE for ACK grant allocation may be included in a predetermined MAC management message. Also, if ACK grant is not allocated to the relay station until a specific time (timer or duration, for example, next superframe, etc.), the relay station may request an uplink resource for ACK message transmission through a random access process. In this case, if there is a useful resource, the relay station may transfer ACK message to the base station (or superordinate base station) through the corresponding resource without waiting for allocation of either an uplink resource through a random access process or ACK grant.

Hereinafter, a method for allocating multicast ID and RSID in accordance with another embodiment of the present invention will be described.

1) RSID

The RSID is intended to identify relay stations at interface between base station/superordinate relay station and subordinate relay station. The base station/superordinate relay station may allocate such RSID during an initial entry process of the subordinate relay station. At this time, the allocated ID may be station identifier (STID) of 12 bits.

2) Multicast ID

The base station and the superordinate relay station should transfer the changed SFH information to their subordinate relay station. At this time, the RS_ESI message that includes the corresponding changed SFH information can be transferred to the subordinate relay station in accordance with a multicast mode. Accordingly, the base station and the superordinate relay station can allocate multicast ID of all subordinate relay stations through an ARS configuration process, i.e., an RS configuration command message.

Hereinafter, a method for allocating multicast ID in accordance with another embodiment of the present invention will be described in more detail.

According to this embodiment, x bit-MSB value of a subordinate relay station having one multicast ID can be configured equally to x bit-MSB value of the multicast ID. This will be described with reference to FIG. 7.

Figure 7:
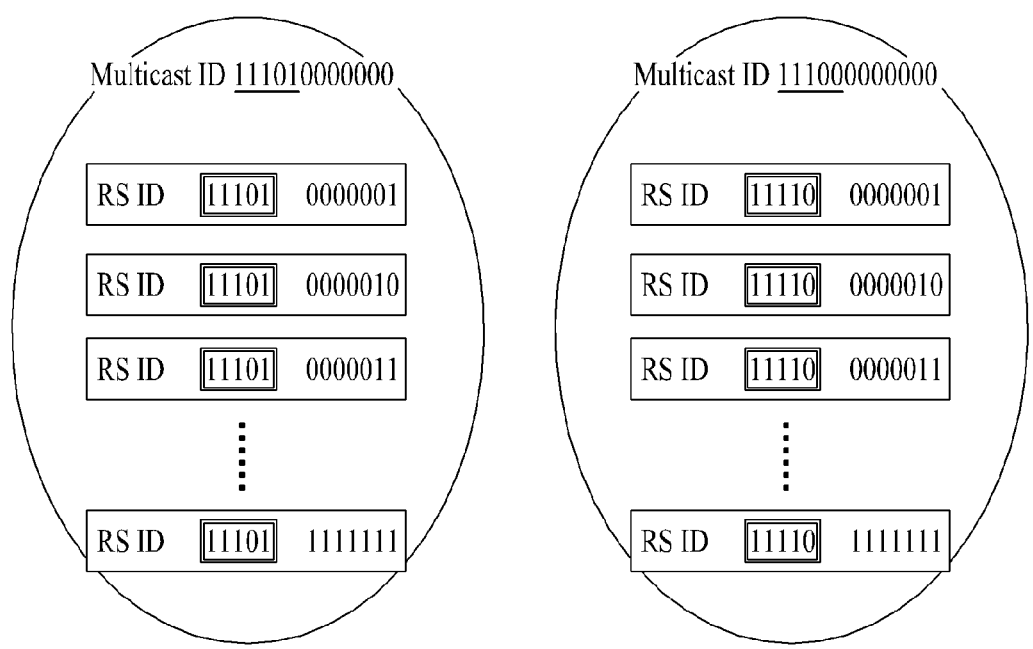
FIG. 7 is a diagram illustrating an example of a method of configuring relay station identifier and multicast identifier in accordance with another embodiment of the present invention.

FIG. 7 is a diagram illustrating an example of a method of configuring relay station identifier (RSID) and multicast identifier (multicast ID) in accordance with another embodiment of the present invention.

Referring to FIG. 7, it is assumed that multicast ID is 111010000000 and x is 5 at the left. In this case, RSID within the corresponding multicast ID is in the range of 111010000001 to 111011111111. Also, it is assumed that multicast ID is 111100000000 and x is 5 at the right. In this case, RSID of the corresponding multicast ID is in the range of 111100000001 to 111101111111. In FIG. 7, the base station allocates ID to each relay station in the ascending order. However, this is only exemplary, and allocation of RSID may follow the descending order.

The base station and the superordinate relay station can report whether the message (i.e., RS_ESI message) transferred through multicast ID has been received. In this case, since the base station and the superordinate relay station can identify a total of subordinate relay stations existing within the corresponding ID, they can allocate uplink resources for reporting ACK of the corresponding message as much as the number of subordinate relay stations through the RS_ESI message or A-MAP IE.

Configuration of Mobile Station and Base Station

Hereinafter, as other embodiment of the present invention, a mobile station (MS) and a femto base station (FBS) through which the embodiments of the present invention can be carried out will be described.

The mobile station is operated as a transmitter in an uplink, whereas the mobile station is operated as a receiver in a downlink. Also, the base station is operated as a receiver in the uplink, whereas the base station is operated as a transmitter in the downlink. In other words, each of the mobile station and the base station can include a transmitter and a receiver for transmission and reception of information or data.

The transmitter and the receiver can include a processor, a module, a part, and/or a means, for which the embodiments of the present invention are carried out. In particular, the transmitter and the receiver can include a module (means) for encoding messages, a module for decoding the encoded messages, and an antenna for transmitting and receiving messages. An example of the transmitter and the receiver will be described with reference to FIG. 8.

Figure 8:
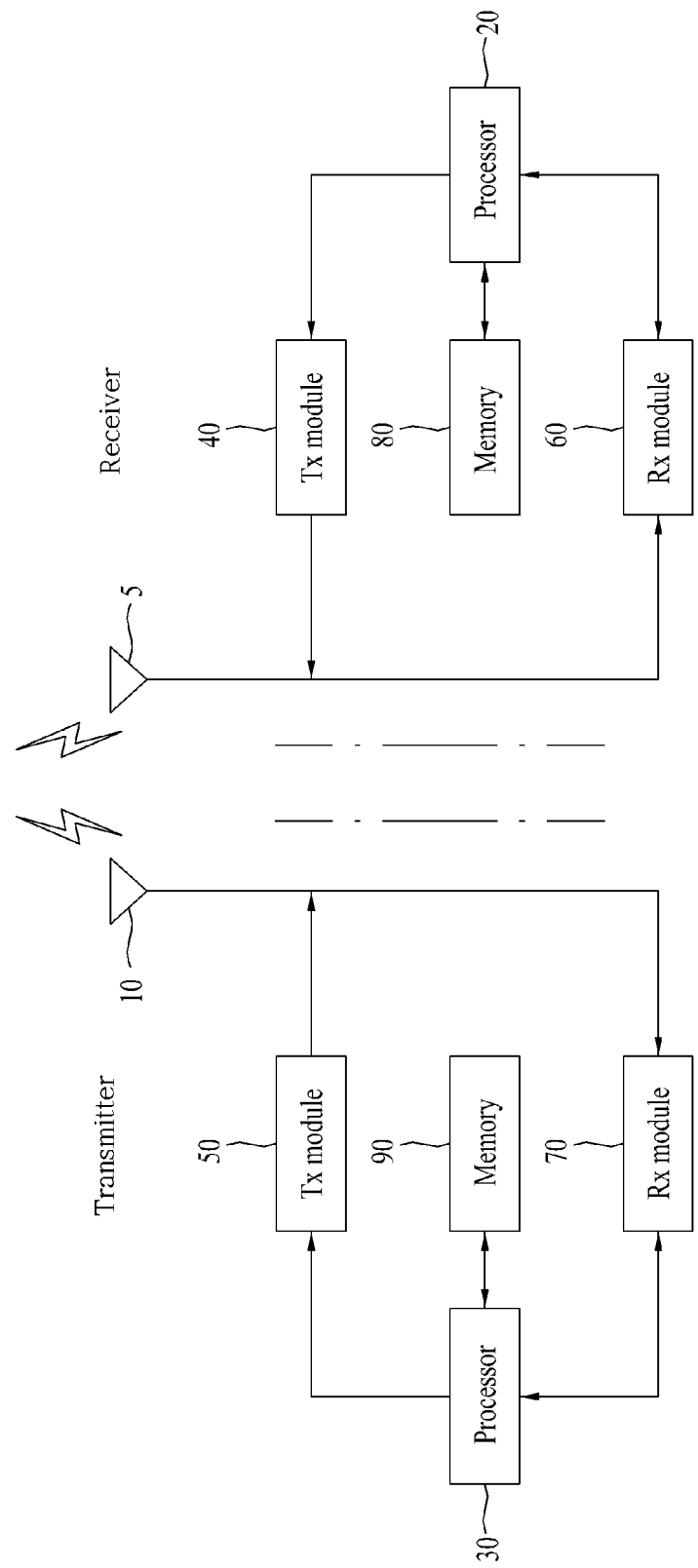
FIG. 8 is a block diagram illustrating an example of a transmitter and a receiver according to other embodiment of the present invention.

FIG. 8 is a block diagram illustrating an example of a transmitter and a receiver according to other embodiment of the present invention.

Referring to FIG. 8, the left side represents a structure of the transmitter while the right side represents a structure of the receiver. Each of the transmitter and the receiver can include an antenna 5, 10, a processor 20, 30, a Tx module 40, 50, an Rx module 60, 70, and a memory 80, 90. The respective elements can perform functions corresponding to those of counterparts. Hereinafter, the respective elements will be described in more detail.

The antenna 5, 10 serves to transmit a signal generated by the Tx module 40, 50 to the outside or receive a radio signal from the outside to transfer the radio signal to the Rx module 60, 70.

If a MIMO function is supported, two or more antennas may be provided. The antenna, the Tx module, and the Rx module can constitute a radio frequency (RF) module.

The processor 20, 30 generally controls the whole operation of the mobile station. For example, the processor 20, 30 can perform a controller function for performing the aforementioned embodiments of the present invention, a medium access control (MAC) frame variable control function according to service characteristics and radio wave condition, a handover function, an authentication and encryption function, etc. In more detail, the processor 20, 30 can perform the whole control for performing the aforementioned procedure of transmitting/updating system information.

Particularly, the processor of the relay station controls a radio communication module to receive the RS_ESI message from the base station, and acquires the updated system information of the base station, which is included in the RS_ESI message. The processor of the relay station can perform application of the updated system information in a sub-packet unit at the corresponding timing using a field indicating the update time per sub-packet. Also, the processor of the relay station can control the radio communication module to transmit the AAI_MSG-ACK message to the base station, thereby reporting to the base station that the RS_ESI message has been received successfully. At this time, the uplink resource for transmitting the AAI_MSG-ACK message can be allocated through the MAC management message or A-MAP IE CRC masked by predetermined broadcast ID or multicast ID.

In addition, the processor of the relay station can perform the whole control operation of processes disclosed in the aforementioned embodiments.

The Tx module 40, 50 performs predetermined coding and modulation for data, which are scheduled from the processor 20, 30 and then transmitted to the outside, and then transfers the coded and modulated data to the antenna 10.

The Rx module 60, 70 performs decoding and demodulation for the radio signal received from the outside through the antenna 5, 10 to recover original data and then transfer the recovered data to the processor 20, 30.

The memory 80, 90 may store a program for processing and control of the processor 20, 30, or may perform a function for temporarily storing input/output data (ESI information, etc.). Also, the memory 80, 90 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the mean time, the base station and the relay station perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for updating advanced base station (ABS) system information by an advanced relay station (ARS) in a wireless communication system, the method comprising:
    receiving, at the ARS, the ABS system information broadcasted periodically from an advanced base station;
    performing network entry with the advanced base station;
    transmitting ARS system information whenever the advanced base station broadcasts the ABS system information;
    when a parameter of the ABS system information is updated at the advanced base station, receiving, at the ARS, a first message including update information related to the updated parameter of the ABS system information from the advanced base station, the update information including a superframe number action field indicating a time when the update information included in the first message is applied, in a superframe unit;
    transmitting, from the ARS to the advanced base station, a second message for acknowledgment of the first message; and
    applying, at the ARS, the update information at the time indicated by the superframe number action field.

2. The method of claim 1,
    wherein the ABS system information includes at least one of a first sub-packet, a second sub-packet, and a third sub-packet,
    wherein the update information includes a change count field indicating a change count of the ABS system information, and a bitmap field indicating whether each of the sub-packets is included in the first message, and
    wherein the bitmap field includes a first bit, a second bit and a third bit for indicating an existence of each of the sub-packets respectively.

3. The method of claim 1, wherein the first message is a relay station essential system information message, and the second message is an acknowledgement (ACK) message.

4. A method for updating advanced base station (ABS) system information received in an advanced relay station (ARS) by an advanced base station in a wireless communication system, the method comprising:
    performing a network entry procedure for the advanced relay station;
    broadcasting the ABS system information periodically whenever the advanced relay station broadcasts ARS system information periodically;
    updating a parameter of the ABS system information in the advanced base station;
    transmitting a first message including update information related to the updated parameter of the ABS system information to the advanced relay station; and
    receiving, from the advanced relay station, a second message for acknowledgment of the first message,
    wherein the update information includes a superframe number action field indicating a time when the update information included in the first message is applied, in a superframe unit, and the update information is applied at the time indicated by the superframe number action field.

5. The method of claim 4,
wherein the ABS system information includes at least one of a first sub-packet, a second sub-packet, and a third sub-packet, and
wherein the update information further includes a change count field indicating change count of the ABS system information, and a bitmap field indicating whether each of the sub-packets is included in the first message, and
wherein the bitmap field includes a first bit, a second bit and a third bit for indicating an existence of each of the sub-packets respectively.

6. The method of claim 4, further comprising retransmitting the first message to the advanced relay station if the second message is not received from the advanced relay station.

7. The method of claim 4, wherein the first message is a relay station essential system information message, and the second message is an acknowledgement (ACK) message.

8. An advanced relay station (ARS) in a wireless communication system, the advanced relay station comprising:
a processor; and
a radio frequency (RF) module configured to transmit and receive a radio signal under the control of the processor,
wherein the processor is configured to control the RF module to receive advanced base station (ABS) system information from an advanced base station, to perform network entry with the advanced base station, and to broadcast ARS system information whenever the advanced base station broadcasts the ABS system information, and
wherein if a parameter of the ABS system information has been updated in the advanced base station, the processor controls the RF module to receive a first message including update information related to the updated parameter of the ABS system information from the advanced base station, the update information including a superframe number action field indicating a time when the update information included in the first message is applied, in a superframe unit, to transmit a second message for acknowledgment of the first message to the advanced base station, and control the update information to be applied at the time indicated by the superframe number action field.

9. The advanced relay station of claim 8,
wherein the ABS system information includes at least one of a first sub-packet, a second sub-packet, and a third sub-packet,
wherein the update information about the changed part includes a change count field indicating change count of the ABS system information, and a bitmap field indicating whether each of the sub-packets is included in the first message, and
wherein the bitmap field includes a first bit, a second bit and a third bit for indicating an existence of each of the sub-packets respectively.

10. The advanced relay station of claim 8, wherein the first message is a relay station essential system information message, and the second message is an acknowledgement (ACK) message.

\* \* \* \* \*